United States Patent [19]

Knippelmier

[11] Patent Number: 5,425,076
[45] Date of Patent: Jun. 13, 1995

[54] CELLULAR COMMUNICATIONS TEST SYSTEM

[75] Inventor: Gary H. Knippelmier, Austin, Tex.

[73] Assignee: Minnesota Mining and Manufacturing Company, St. Paul, Minn.

[21] Appl. No.: 906,924

[22] Filed: Jun. 30, 1992

[51] Int. Cl.$^6$ .................... H04M 1/24; H04M 11/00; H04Q 7/00; H04B 17/00

[52] U.S. Cl. .......................................... 379/27; 379/1; 379/58; 379/59; 455/33.1; 455/67.1

[58] Field of Search ...................... 379/1, 5, 15, 27, 29, 379/32, 58, 59, 21; 455/33.1, 32.4, 67.1

[56] References Cited

U.S. PATENT DOCUMENTS

| | | | |
|---|---|---|---|
| 4,180,708 | 12/1979 | Yamaguchi et al. | 179/2 EB |
| 4,415,770 | 11/1983 | Kai et al. | 179/2 EB |
| 4,443,661 | 4/1984 | Kubo | 179/2 EB |
| 4,451,712 | 5/1984 | Kovarik | 179/175.3 |
| 4,554,410 | 11/1985 | Furumoto | 179/2 E |
| 4,662,438 | 11/1986 | Shimizu et al. | 379/63 |
| 4,817,126 | 3/1989 | Hendershot | 379/58 |
| 4,829,554 | 5/1989 | Barnes et al. | 379/58 |
| 4,903,323 | 2/1990 | Hendershot | 455/67 |
| 4,977,399 | 8/1988 | Price et al. | 379/59 X |
| 5,016,269 | 5/1991 | Rogers | 379/59 |
| 5,023,900 | 6/1991 | Tayloe et al. | 379/32 |
| 5,031,204 | 7/1991 | McKernan | 379/63 |
| 5,095,500 | 3/1992 | Tayloe et al. | 379/32 |

FOREIGN PATENT DOCUMENTS

| | | | |
|---|---|---|---|
| 144072 | 11/1984 | European Pat. Off. | H04M 3/24 |
| 418853 | 9/1990 | European Pat. Off. | H04Q 7/04 |
| WO93/15569 | 8/1993 | WIPO | H04B 17/00 |

OTHER PUBLICATIONS

Brochure—Cellstar/Sage, pp. 1-16, Copyright 1991.
Brochure—ZK Celltest, Inc., pp. 1-31, Copyright Dec. 1991.
Brochure—APC 1056C/Responder Plus, Chapter 1-7, Copyright 1988.
Guidelines—Compatibility Bulletin No. 106, pp. 1-23, Dec. 1981.
Handbook—The Cellular Radio Handbook, Copyright 1990.
Brochure—SAFCO/Smrtsam Plus/Performance Analysis System—1992.
Brochure—SAFCO/Smrtsam/Cellular System Access Monitor—1992.
Brochure—Motorola/R-2600 Communications System Analyzer, 1991.
Brochure—Cellspan/LCC Incorporated, pp. 1-4, Copyright 1991.

Primary Examiner—Stephen Chin
Assistant Examiner—Paul Loomis
Attorney, Agent, or Firm—Gary L. Griswold; Walter N. Kirn; Jack V. Musgrove

[57] ABSTRACT

A testing system for wireless communication networks, particularly cellular networks, having a test set located in a cell site which communicates through the cell's base station to a responder at the mobile telephone switching office (MTSO). The test set, which includes a measurement module, controller, modem, and cellular phone, initiates the call to the responder, and directs the responder to transmit and receive certain test signals which are then measured by the measurement module. The tests preferably include standard "105" tests. The test set, which may be fixed or mobile, provides essentially continuous monitoring of voice channels within a given cell, and can send an alarm in near real-time to the network control center when a faulty voice channel is detected.

22 Claims, 6 Drawing Sheets

CELLULAR COMMUNICATIONS TEST SYSTEM

BACKGROUND OF THE INVENTION

1. Field of the Invention

The present invention generally relates to testing devices for communications systems, and more particularly to a system for testing voice transmission quality in a cellular communications network.

2. Description of the Prior Art

In the last several years, the telephony industry has seen a dramatic rise in the use of wireless forms of communication, particularly cellular networks. As most cellular subscribers know, however, signal quality in cellular networks is generally much poorer than that found in land-based systems (i.e., copper and fiber optic transmission). Thus, more users are demanding the same quality (audio) in cellular connections as are found in landline connections. Such a parity has yet to be achieved, however, for several reasons. First of all, the causes of signal degradation in a cellular setting are quite different from those in a land-based system. In addition to possible problems in the landline or the public switched telephone network (PSTN), problems can arise at any point in the remaining signal path, including the cellular base station, the radio wave path, and the mobile unit. Moreover, although some systems include means (such as antennas having VSWR and TX alarms) for detecting signal deterioration under certain conditions, there are many causes of reduced signal strength which will not be detected, including water in an antenna, partial lightning damage to an antenna or cable, recently created obstructions (new buildings), a damaged feeder, or a damaged, faulty or waterlogged connector.

The divergence between land-based and cellular transmission quality may also be due in part to the fact that no formal standards have been established for measuring the quality of cellular transmissions. By way of comparison, telephone companies presently use a series of measurements commonly referred to as "105" tests, in order to evaluate signal transmission on telephone trunk lines. The 105 tests have become a de facto standard throughout North America for measuring voice transmission quality. These tests (which are discussed further below in conjunction with FIG. 1) are carried out by one of several available testing systems, such as the START or CAROT systems. START is a trademark of Minnesota Mining and Manufacturing Co. (3M), assignee of the present invention; CAROT is not a trademark, but is an acronym for American Telephone and Telegraph Co.'s centralized automatic reporting on trunks system. These systems utilize certain hardware at each end of the trunk line to be tested, including ROTL's (remote office test line devices), responders and interrogators. In these systems, a controller (such as a personal computer) directs a ROTL to make the appropriate connection to the trunk to be tested, and instructs the ROTL on which of the 105 tests to perform. The test sets at both ends respond to various commands from the controller (via the ROTL), and send the test results back to the controller in an encoded format, such as frequency shift keying (FSK). The controller then generates a report based on the test results.

Most cellular test systems, in contrast, provide little or no capability for objective measurement of voice quality. In general, cellular test systems (not including hardware-specific diagnostic equipment) fall into one of two categories: devices which monitor transmission performance, and those which are used to troubleshoot problems, once found. The most common monitoring devices are system access monitors (SAM's) and "loopback" testers. SAM's (which may be fixed or mobile) scan cellular channels, measuring certain transmission characteristics and recording various system parameters; they may also be provided with geographic referencing. An exemplary SAM is disclosed in U.S. Pat. No. 5,023,900. Although some of these devices do measure signal strength, carrier-to-interference (C/I) ratios, and signal-to-noise ratios, none of them perform even one of the standard 105 tests.

Loopback testers simply check transmission continuity at various sections of the communications path; they generally do not analyze transmission quality at all. Exemplary loopback testers are described in U.S. Pat. Nos. 4,180,708 (checks land-lines between the control station and the base station); 4,415,770 and 4,443,661 (checks wireless transmission between test transmitter and base station); 4,622,438 (checks wireless transmission between subscriber stations and the base station); 4,829,554 (checks land-lines between the control station and the base station, and between given modules within a single base station); and 4,903,323 (checks wireless transmission between a test transmitter and a subscriber station).

Similarly, early troubleshooting devices did not perform any of the 105 tests, although they did measure signal strength and SINAD (a combined measure of the signal-to-noise ratio and distortion). Some of these devices, often referred to as communication system analyzers, also provided various diagnostic tools, such as a wattmeter, a frequency counter, a spectrum analyzer, a voltmeter, and a signal generator. See, e.g., U.S. Pat. Nos. 4,451,712 (for testing base station equipment) and 4,554,410 (for testing a mobile phone). More recently, however, analyzers have been introduced which additionally perform three of the five 105 tests, namely, C-message noise, C-notched noise, and 3-tone slope.

The primary disadvantage of cellular analyzers, even if they are provided with some 105 testing capability, is that they are only used after a problem has been identified, usually by an irate subscriber. Clearly, it would be preferable to perform transmission quality tests continuously to allow early recognition of the problem. Continuous monitoring is all the more desirable considering the possibility of a catastrophic failure in the cellular system. Such failures are relatively common—the mean time between failures (MTBF) for cellular transceivers is about one year; and, even though the MTBF for antennas is about 20 years, since a typical "cellular city" has at least 200 antennas, this works out to an average of 10 antenna failures per year. Another limitation with most analyzers is that they do not perform the tests in the same manner as the customer uses the system. It is thus less likely that the test results will be directly related to how a customer interprets the quality of the audio connection.

One system has, however, overcome many of the foregoing problems. This automated test system for cellular networks, which is very similar to the operation of ROTL's, is depicted in FIG. 1, and is perhaps the closest prior art to the present invention. A controller 1, such as a personal computer (PC), and a test set 2 are located within the mobile telephone switching office (MTSO) 3. Controller 1 is connected to both test set 2 and the switching network 4, whereby controller 1 may direct switch 4 to seize a specific one of the trunk lines 5 leading to a base station 6, and connect that line to test set 2 (lines 5 may be land-based or digital microwave). Controller 1 then issues appropriate commands to test set 2 to dial up the phone number associated with a far-end responder 7 located in the same cell site 8 as base station 6. Once the link is established, controller 1 issues further commands to begin the 105 tests, as well as other tests such as SINAD measurements.

The primary disadvantage in this system is the extreme difficulty of seizing a specific trunk line and passing that line to the test set. Unlike public switch telephone networks (PSTN's), cellular switches have not been designed for such capturing of the trunk lines, so the prior art system of FIG. 1 requires a specialized hardware interface between the switch and the controller, as well as customized software. Moreover, the interface and software are unique for each type of switch (i.e., from different manufacturers). This system is accordingly very expensive, and it still suffers several limitations. First, only one controller at a time may be used on any given switch; this educes the monitoring capability of the system since the switch serves 20-50 cell sites but cannot simultaneously test all of the cells. This limitation is amplified by the fact that there are 15-65 voice channels in each cell. Thus, the prior art system is not truly continuous since different cell sites must share the test set, adversely affecting the system's ability to detect intermittent problems in transmission quality. Secondly, if a fault is detected, this system cannot ascertain whether it is due to a problem with the trunk line or the wireless communication path. Thirdly, the prior art system fails to test the transmission in the same manner as the network is used by a mobile user, since it cannot initiate testing from a mobile station. Finally, while the prior art system can provide regular reports, it does not provide an alarm capability which notifies the network control center immediately upon detection of a potential problem in the transmission system.

Due to the foregoing disadvantages, as well as the cost of this prior art system, most cellular operators still rely on a rather outdated technique for testing voice quality. This technique, known as "calling through" or "drive testing," requires many technicians to drive through the cell sites and manually dial up a special number which emits various audio messages to the technician, who then determines the quality of the transmission. See, e.g., U.S. Pat. No. 5,031,204. Alternatively, the technician may dial up another technician to test both directions. Besides the obvious concern with this subjective analysis, this technique is labor intensive, time consuming, and often incomplete. Moreover, if the cause of poor signal transmission is intermittent, it may not be detected in spite of an apparently thorough search. It would, therefore, be desirable and advantageous to devise an automated, cellular communications test system which would provide improved testing of voice quality transmission, without requiring the difficult seizure of base station trunk lines at the MTSO. The system would preferably provide essentially continuous monitoring of a given cell site, initiated from a mobile station within the cell, with an alarm capability for quick attention to transmission problems. It would also be beneficial to allow determination of the location of any problem as between the base station trunk line and the wireless communication path.

SUMMARY OF THE INVENTION

The present invention is generally comprised of a test set, located within a cell site (fixed or mobile), which is programmed to monitor voice channels by calling a responder connected to the switch of the MTSO serving the cell. Multiple responders may be provided at a single switch, one dedicated to each cell site. Statistical processing may be employed to set alarm thresholds, and the test set accordingly programmed to call the network control center in the event of a voice channel failure. If a local switch is provided at the base station, with a responder, then the system may further pinpoint any problem as between the cell station trunk line and the wireless communication path.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 2:
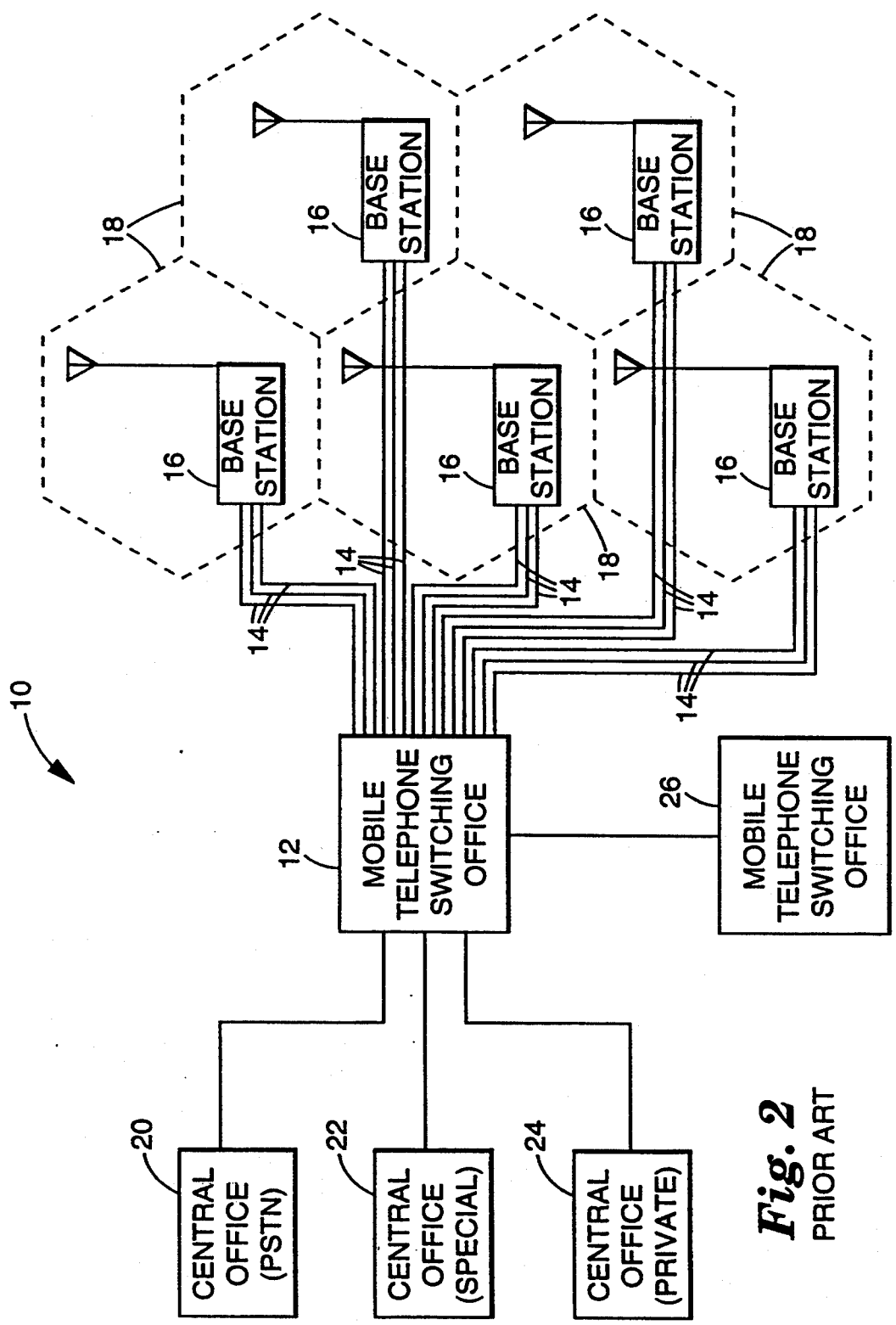
FIG. 2 is a block diagram of a typical prior art cellular network.

With reference now to the figures, and in particular with reference to FIG. 2, there is depicted a typical, prior art cellular network 10, which includes a mobile telephone switching office (MTSO) 12 connected by trunk lines 14 to several base stations 16 in adjacent cell sites 18. Each trunk line 14 (which may be either land-based or microwave) is dedicated to a particular voice channel at one of the cell sites. Cells usually have 15-65 voice channels. MTSO 12 is connected by regular telephone trunk lines to various central offices, such as a public switch telephone network (PSTN) 20, a special switching office 22 (e.g., "911" emergency service), or a private switching office 24, as for a private long-distance carrier. MTSO 12 may also be connected to neighboring MTSO's 26. For a more complete discussion of cellular networks in general, see U.S. Pat. No. 4,829,554.

Figure 3:
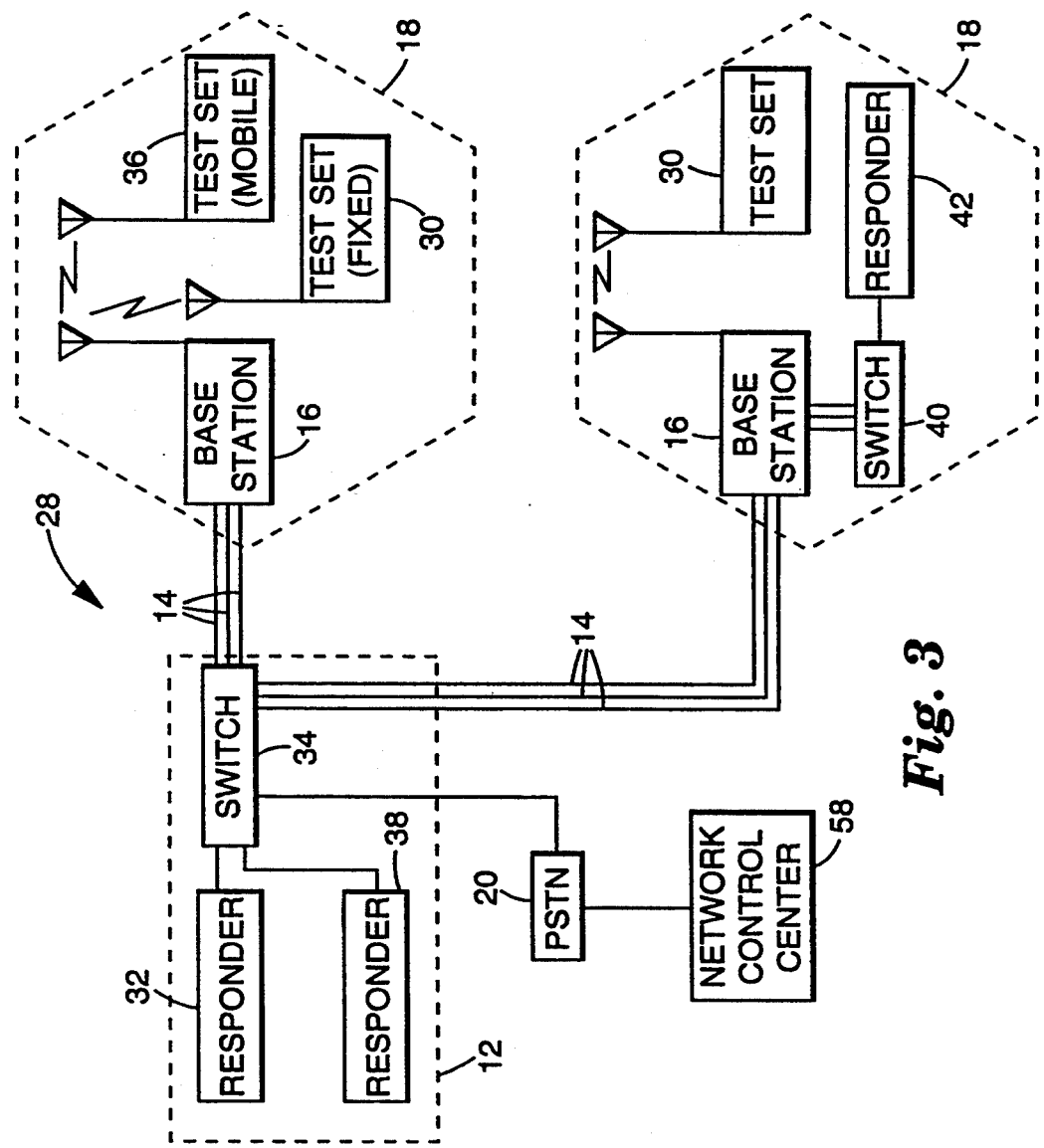
FIG. 3 is a block diagram of the cellular communications test system of the present invention.

Referring now to FIG. 3, in the cellular communications test system 28 of the present invention, a test set 30 is provided for each cell site 18, preferably located at the same facility as base station 16. Test set 30 (which is discussed further below in conjunction with FIG. 4) is programmed to call a telephone number associated with a responder 32 connected to the switch 34 at MTSO 12. A mobile test set 36 may alternatively (or additionally) be provided, for example, in a service vehicle; test sets could be located at many other locations, such as an emergency callbox.

Responder 32 may perform any of the 105 tests, including two-way measurement of: loss (level or gain) at 1004 Hz; return loss; gain/slope (3-tone slope) at 404 Hz, 1004 Hz and 2804 Hz at −16 dBm; noise (C-message filtering); and noise with tone (C-notch noise). A conventional responder may be used with system 28, such as 3M's 1056 C responder. Improved responders may be used which additionally test impulse noise, gain-hits, dropouts, SINAD, intermodulation distortion, etc. Advantageously, no special interface is needed to connect responder 32 to switch 34. Rather, a subscriber line (preferably 4-wire, type II with E & M signalling) can be used. Other responders 38 may be provided at MTSO 12, each dedicated to one cell site 18. In other words, each test set located within a particular cell would be programmed to dial up the same responder. Alternatively, the test sets could be programmed to call up a secondary, tertiary, etc., responder as necessary (if the primary responder is busy or not answering).

Test set 30 is also preferably equipped with conventional circuitry for recording received signal strength indication (RSSI), the voice channel number, and the time it takes to make the connection to the voice channel. Those skilled in the art will appreciate that test set 30 could include conventional circuitry to test for bipolar violations and bit error ratios on digital transmission lines. Improved test sets could also record additional parameters such as control channel data, supervisory audio tones (SAT's), word sync, busy/idle conditions, power settings, etc.

Those skilled in the art will appreciate that system 28 can, under certain conditions, diagnose whether a problem lies in the trunk lines 14 or in the wireless communications path. Specifically, if a given voice channel fails one or more of the 105 tests, and if its RSSI is contemporaneously low, then this is a strong indication that the problem lies in the wireless path (notably, the prior art system of FIG. 1 cannot perform this sort of analysis since it cannot record RSSI). It is possible, however, for a channel to fail one of the 105 tests but still exhibit a satisfactory RSSI. To address this scenario, a further embodiment of system 28 may be provided wherein a local switch 40 is provided at base station 16, connected to another responder 42. Switches are not normally installed at the base station, but it is certainly possible to provide such local switching, although it would probably be cost prohibitive at the present time. Nevertheless, with this arrangement, test set 30 may be programmed to call up the local responder 42. Such local testing would particularly be performed if testing through to responder 32 indicated a problem somewhere in the combined trunk/wireless communications path; use of responder 42 would pin down the problem as being either in trunk lines 14 or the wireless path (responder 42 could also be used by the prior art system of FIG. 1).

Figure 4:
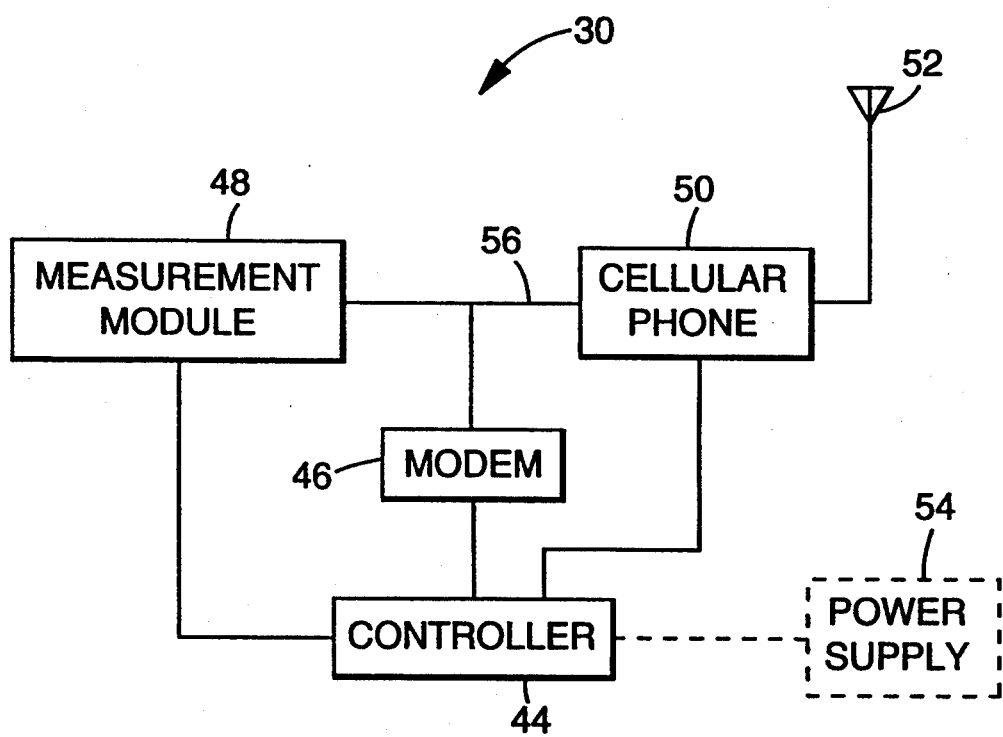
FIG. 4 is a block diagram of the components of the test set used in the system of the present invention.

With further reference to FIG. 4, test set 30 is generally comprised of a controller 44 which is connected to a conventional modem 46, a measurement module 48, and a cellular telephone 50 having an antenna 52 connected thereto. A power supply 54 may also be provided for portable test sets. All of the foregoing components may easily be packaged in a small housing. Controller 44 is basically a microprocessor having volatile (RAM), non-volatile (EEPROM) memory, and an internal clock. The program instructions for controller 44 are located in the EEPROM, while the RAM is used for temporary storage of data which is processed during operation of test set 30. As mentioned further below, controller 44 may be remotely programmed via modem 46, but to locally program controller 44, it should have an I/O port (an RS232 connector) or a display and input device (keyboard). A display may also be used to provide a graphic representation of the current status of the test set. A microprocessor-based controller is preferable, but a conventional personal computer could serve as a controller. Measurement module 48 is simply a conventional near-end responder. A single voice bus 56 may be used to interconnect modem 46, measurement module 48, and cellular phone 50.

Any conventional cellular phone may be used in test set 30, but controller 44 must be configured to the specifications associated with the particular phone chosen, or an appropriate interface must be provided. In the preferred embodiment, controller 44 is programmed to mimic the timing sequences and recognize the control codes of the particular phone 50 used. These sequences and codes are generally proprietary to the cellular phone manufacturers (including American Telephone & Telegraph Co., Ericsson GE Mobile Communications Corp., Motorola Inc., NEC America, Inc., or Oki Telecom Co.), who may provide an appropriate interface for their respective phones. Alternatively, an interface may be provided by third party vendors, such as the PCLINK 7E41 interface developed by Telular, Inc., of Chicago, Ill., which is designed to connect a PC to the data port of a KS30 cellular phone sold by Motorola Inc. of Schaumburg, Ill. Similar interfaces are used in SAM's.

Figure 1:
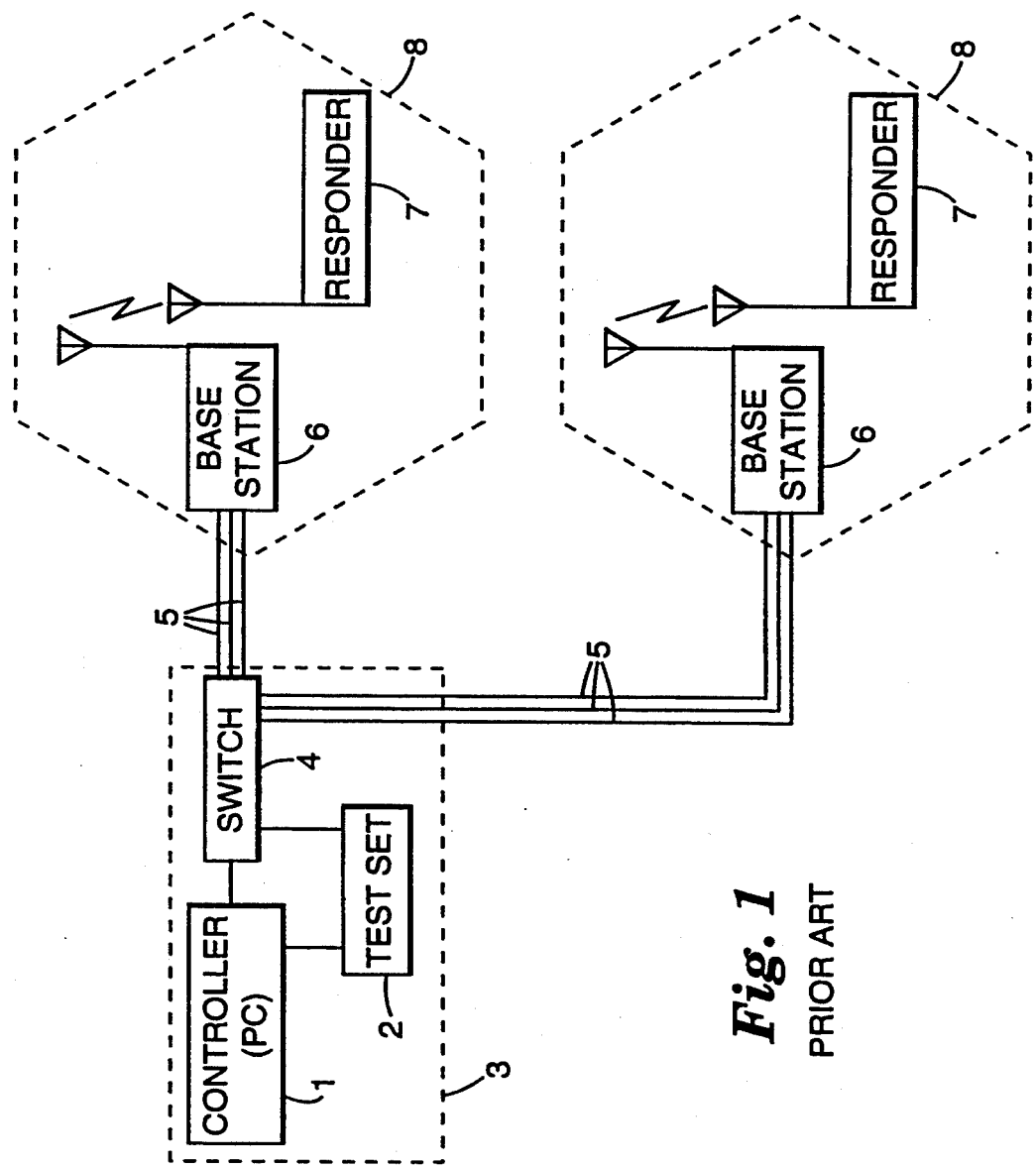
FIG. 1 is a block diagram of a prior art cellular testing system.

It should be noted that any interface between the controller and the phone is far less problematic that the special hardware and software requirements for the prior art system of FIG. 1. In that system, a different interface is required for each different type of switch, but in the system of FIG. 3, only one interface is required, for one of a multitude of available cellular phones.

Figure 5A:
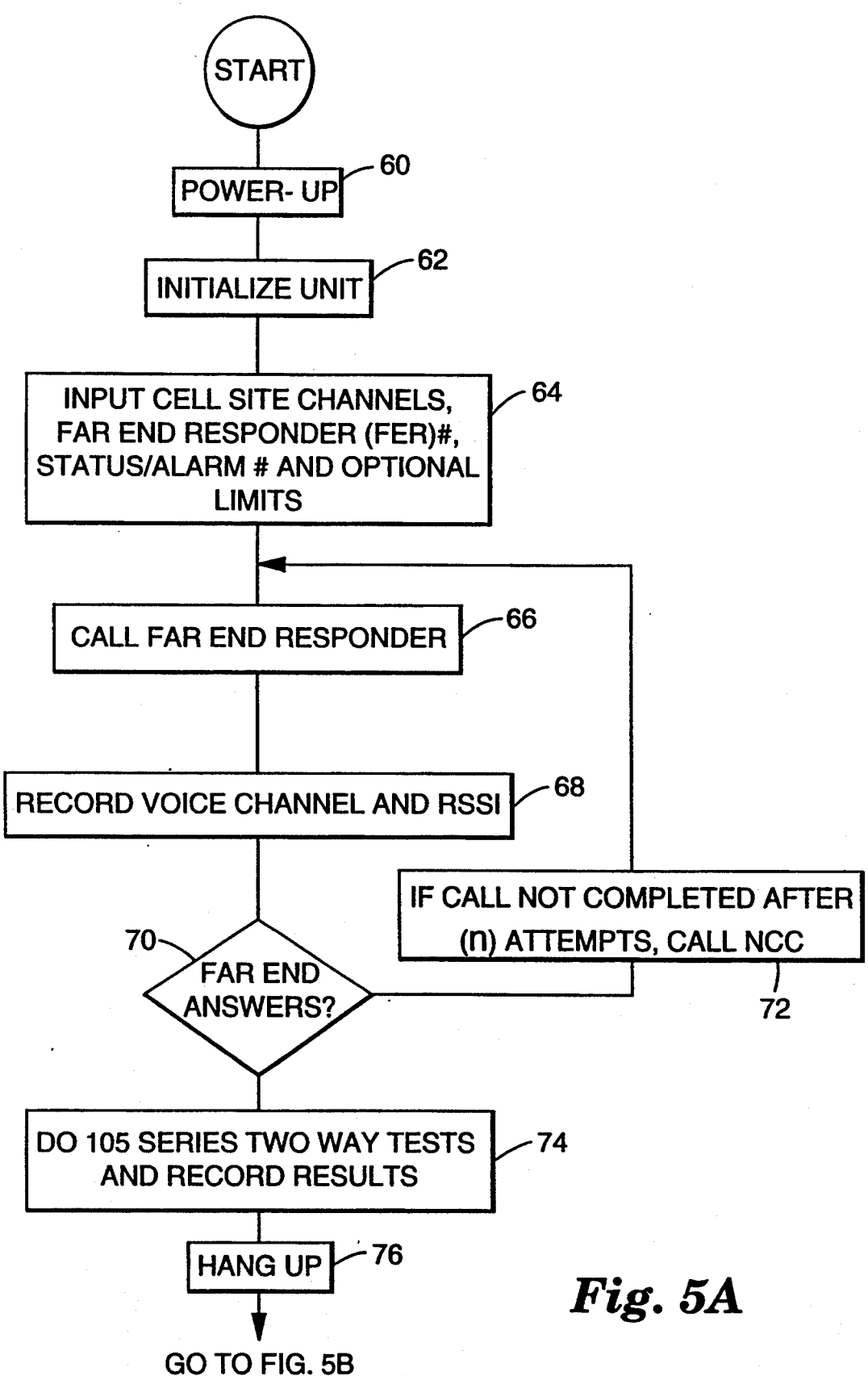
FIGS. 5A and 5B comprise a single flowchart depicting operation of the system of the present invention.
Figure 5B:
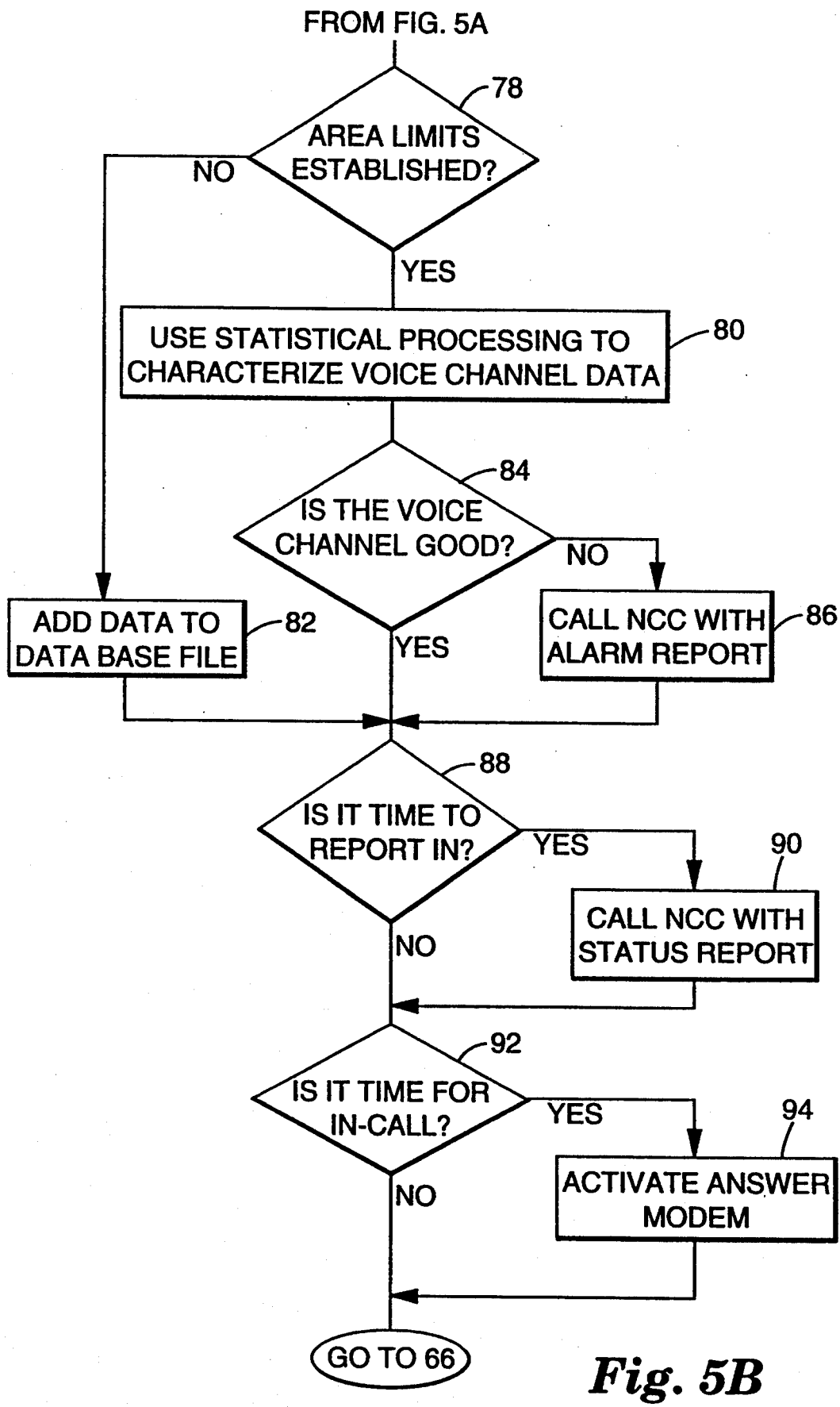

Operation of system 28 may best be understood with reference to FIG. 5. When the unit is first powered up (60), it will perform diagnostic tests and load program instructions during initialization (62). If the unit has not been used before, the operator will be prompted (either through the display device of controller 44 or via another device connected to the I/O port) for certain cell site information (64). These data include the cell site number, the phone number(s) of a far-end responder 32, the phone number(s) to an alarm system and/or reporting system at a network control center (NCC) 58 (FIG. 3), and the specific voice channels in the cell. As explained below, test set 30 can actually build a file of the voice channel numbers, provided that each of the channels is minimally functioning, i.e., that base station 16 is capable of assigning each of the available voice channels; however, to ensure that test set 30 properly monitors all voice channels, it is preferable that they be manually entered. The operator may optionally enter performance threshold limits, although these may also be determined automatically as explained below.

If the unit has been used before and retains the cell site information, it will query the operator whether to use the old data.

The first step in testing is to call the far-end responder (66). As soon as base station 16 assigns a voice channel, the voice channel number and RSSI are recorded (68). If a voice channel is never assigned, or the responder does not answer (70), test set 30 calls NCC 58 (after one or more such failures) and reports the time of the failure(s) along with the channel number and RSSI (72). If the responder answers, the 105 tests are performed in both directions and the results recorded (74). The unit then hangs up (76).

If performance limits have been established (78), either by manual entry or statistical generation, then the voice channel is characterized as good or bad (80) based on these limits. If limits have not been established, the voice channel data are added to a database file (82) and program flow continues at step 88, discussed below. Upon reference to the following disclosure, those skilled in the art will appreciate the many different statistical techniques that may be used to generate the limits as well as characterize the test results. The following methods are deemed preferable.

To generate the performance thresholds, a database file of test values must first be compiled for each test, e.g., each of the five 105 tests (in both directions), and RSSI. Each database file includes several "subgroup" samples (e.g., 25) of the particular test value, for each channel in the cell. Each subgroup sample is an average of 2–5 measurements of the particular test. From this database file, a grand average test value may be determined for each channel, as well as a cell grand average based on subgroup sample averages from all channels. The deviation in values within a subgroup may also be used to determine a range for each subgroup, and an average of those ranges for the channel, thereby establishing the threshold limits. For example, upper and lower limits $L_u$ and $L_v$ may be calculated according to the following formulae:

$$L_u = X + cR$$

$$L_v = X - cR$$

where X is the (channel or cell) grand average test value, R is the (channel or cell) average range, and c is a multiplier constant which may be set by the cellular operator, but is preferably the "three-sigma limit." Limits may be set for each channel, and/or for the cell site overall.

It is possible that a voice channel (including the corresponding base station trunk line 14) is experiencing transmission problems during the building of the database files. Therefore, when a database file is completed for a given test, a quick comparison of each channel's average values for that test should be made against the cell average. Any deviant channels may be immediately reported by directing program control to step 86.

After the limits have been established, a voice channel's test results may be characterized as good or bad (pass/fail) by comparison with the limits (84). Rather than basing the characterization on a single measurement, it is preferable to compile a small sampling, e.g., 2–4 measurements, for each channel and then compare the average results from these samples to the limits. This averaging smooths out the potential statistical bias in the measurements and prevents unwarranted alarms to the NCC.

If the voice channel is good, controller 44 will next check its internal clock to see if it is time for regular reporting to the NCC (88). If so, the number for NCC 58 is dialed and a status report is downloaded. The test results will reflect any channels which were unaccessible, provided that a complete listing of channels was provided in step 64.

Test set 30 can be programmed to be idle during certain hours, or during certain minutes of every hour, for remote access and reprogramming (92). If it is time for such an in-call (94), controller 44 will next switch to a passive mode and activate modem 46. If a call is received, controller 44 will query the caller regarding changes to the cell site information, phone numbers, limits, etc. If, after a predetermined time, no call is received, program control returns to step 66.

Test system 28 provides many advantages over prior art cellular test devices. For example, since a responder may be provided for each cell site, system 28 provides essentially continuous monitoring and does not have to share resources between the cells. When combined with the ability of the system to notify the NCC in near real-time when a problem is detected, this feature greatly enhances the cellular operator to detect and correct performance impairments before the customer realizes a problem exists. If a problem is reported by a customer before detection by the operator, a service vehicle carrying a mobile test set 36 may be dispatched to the specific locations where the problem occurred, for accurate confirmation.

Since the test call is initiated at a (mobile) station within the cell, it more closely tests the network from a cellular user's perspective. Also, since the 105 tests are used, an objective determination of voice transmission quality is provided. The system is further easily installed, supported, and expanded, and test sets 30 can be added, removed or relocated as needed. Yet, this system minimizes the need for additional technicians as it grows.

Other advantages of system 28 are less apparent. For example, this concept is valid with changing wireless technologies and standards since it is actually independent of the particular RF media used and the switch manufacturer, and may easily be adapted to new tests and standards. It can be used with any conventional cellular system, including AMPS, NAMPS, TDMA, CDMA, GSM, TACS, NMT, CT-2 and DECT, although a phone 50 must be chosen which is compatible. Also, the responders at MTSO 12 can be used to test trunk lines from PSTN 20, in conjunction with a conventional ROTL such as 3M's 1094 ROTL. Finally, a plurality of test sets 30 may be used to perform high-traffic load testing on new base station transceivers.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, those skilled in the art will appreciate that the present invention is not limited in applicability to cellular systems, but can be used in any wireless communication systems, including specialized mobile radio, paging, wireless local area networks (LAN's), and personal communications networks (PCN's). It is therefore contemplated that such modifications can be made without departing from the spirit or scope of the present invention as defined in the appended claims.

I claim:

1. An apparatus for testing transmissions in a wireless communications network, comprising:

phone means for providing wireless access to the network;

measurement means, connected to said phone means, for detecting an incoming test signal transmitted to said phone means from an external source;

processor means for controlling said phone means and said measurement means; and modem means, connected to said processor means and said phone means, for enabling said processor means to communicate with an external control center through said phone means;

wherein said processor means includes means for recording the value of at least one transmission characteristic of the incoming test signal, for comparing said value to a pre-determined pass/fail threshold, and for informing the external control center if said value exceeds said threshold, and said processor means further includes means for recording the received signal strength of the incoming test signal.

2. The apparatus of claim 1 wherein said measurement means includes means for measuring one or more transmission characteristics selected from the group consisting of signal loss, return loss, noise, noise with tone, or 3-tone gain/slope.

3. The apparatus of claim 1 wherein:

said wireless communications network comprises a cellular system characterized by a plurality of cell sites, each of said cell sites having a base station which assigns one of a plurality of voice channels to a given wireless call, each of said voice channels having a unique voice channel number; and said phone means includes means for identifying said voice channel number associated with said call.

4. The apparatus of claim 1 wherein:

the wireless communications network includes (i) a base station for providing wireless communication with said phone means, (ii) remote switch means connected to the base station, for directing calls from the base station to a subscriber line, and (iii) responder means connected to the switch means for transmitting the incoming test signal; and said processor means directs said phone means to dial a number associated with the responder means, and further directs the responder means to transmit the incoming test signal.

5. The apparatus of claim 1 wherein:

the wireless communications network includes (i) a base station for providing wireless communication with said phone means, (ii) local switch means connected to the base station, for directing calls from the base station to a subscriber line, and (iii) responder means connected to the switch means for transmitting the incoming test signal; and said processor means directs said phone means to dial a number associated with the responder means, and further directs the responder means to transmit the incoming test signal.

6. The apparatus of claim 1 further comprising portable means for supplying power to the apparatus.

7. The apparatus of claim 1 wherein said processor means includes:

clock means for determining a reporting time; and
means for downloading a status report to the external control center via said phone means.

8. The apparatus of claim 1 wherein said processor means includes:

clock means for determining an in-call time; and
means for receiving program instructions, via said phone means, during said in-call time.

9. The apparatus of claim 1 wherein said controller means generates said predetermined thresholds based on samplings of the transmission characteristic values.

10. The apparatus of claim 3 wherein said processor means further includes means for recording the elapsed time from initiation of said call to the moment said voice channel is assigned.

11. The apparatus of claim 4 wherein:

said measurement means further includes means for transmitting an outgoing test signal through said phone means; and
the responder means further includes means for detecting the outgoing test signal.

12. The apparatus of claim 4 wherein:

the wireless communications network includes a plurality of the base stations, each connected to the switch means, the switch means further having a plurality of the responder means connected thereto, each of the responder means being associated with a particular base station;
the apparatus is located at a given one of the base station; and
said processor means further includes means for storing a telephone number of the particular responder means which is associated with the given base station.

13. A test system for a wireless communications network which includes a base station for providing wireless communications and switch means remote from the base station for directing calls from the base station to a subscriber line, the system comprising:

responder means connected to the switch means for transmitting an incoming test signal;
a test set having (i) phone means for providing wireless access to the base station, (ii) measurement means, connected to said phone means, for detecting said incoming test signal when transmitted to said phone means, (iii) processor means for controlling said phone means and said measurement means, said processor means directing said phone means to dial a number associated with said responder means, and further directing said responder means to transmit said incoming test signal, and (iv) modem means, connected to said processor means and said phone means, for enabling said processor means to communicate with an external control center through said phone means.

14. The system of claim 13 wherein:

said measurement means further includes means for transmitting an outgoing test signal through said phone means; and
said responder means further includes means for detecting the outgoing test signal.

15. The system of claim 13 wherein:

the wireless communications network includes a plurality of the base stations, each connected to the switch means, the switch means further having a plurality of said responder means connected thereto, each of said responder means being associated with a particular base station;
the test set is located at a given one of the base stations; and
said processor means further includes means for storing a telephone number of the particular responder means which is associated with the given base station.

16. The system of claim 13 wherein said test set is fixed locally at said base station.

17. The system of claim 13 wherein said test set is mobile and remote from said base station.

18. A test system for a cellular communications network which includes a plurality of base stations for providing wireless communications, remote switch means connected to each of the base stations by trunk lines, for directing calls from the base station to a subscriber line, and a network control center connected via a public switch telephone network to the switch means, the system comprising:

a plurality of responder means, each connected to the switch means, for transmitting an incoming test signal, each of said responder means being associated with a particular base station; and a plurality of test sets, each associated with a particular base station, each of said test sets having:

phone means for providing wireless access to the particular base station, measurement means, connected to said phone means, for detecting said incoming test signal when transmitted to said phone means, said measurement means including means for measuring one or more transmission characteristics selected from the group consisting of signal loss, return loss, noise, noise with tone, or 3-tone gain/slope, processor means for controlling said phone means and said measurement means, said processor means directing said phone means to dial a number of said responder means associated with the particular base station, and further directing said responder means to transmit said incoming test signal, and modem means, connected to said processor means and said phone means, for enabling said processor means to communicate with the network control center through said phone means.

19. An apparatus for testing transmissions in a wireless communications network, comprising:

phone means for providing wireless access to the network;

measurement means, connected to said phone means, for detecting an incoming test signal transmitted to said phone means;

processor means for controlling said phone means and said measurement means; and modem means, connected to said processor means and said phone means, for enabling said processor means to communicate with an external control center through said phone means;

wherein the wireless communications network includes (i) a base station for providing wireless communication with said phone means, (ii) remote switch means connected to the base station, for directing calls from the base station to a subscriber line, and (iii) responder means connected to the switch means for transmitting the incoming test signal, and said processor means directs said phone means to dial a number associated with the responder means, and further directs the responder means to transmit the incoming test signal.

20. An apparatus for testing transmissions in a wireless communications network, comprising:

phone means for providing wireless access to the network;

measurement means, connected to said phone means, for detecting an incoming test signal transmitted to said phone means;

processor means for controlling said phone means and said measurement means; and modem means, connected to said processor means and said phone means, for enabling said processor means to communicate with an external control center through said phone means;

wherein the wireless communications network includes (i) a base station for providing wireless communication with said phone means, (ii) local switch means connected to the base station, for directing calls from the base station to a subscriber line, and (iii) responder means connected to the switch means for transmitting the incoming test signal, and said processor means directs said phone means to dial a number associated with the responder means, and further directs the responder means to transmit the incoming test signal.

21. An apparatus for testing transmissions in a wireless communications network, comprising:

phone means for providing wireless access to the network;

measurement means, connected to said phone means, for detecting an incoming test signal transmitted to said phone means;

processor means for controlling said phone means and said measurement means; and modem means, connected to said processor means and said phone means, for enabling said processor means to communicate with an external control center through said phone means;

wherein said wireless communications network comprises a cellular system characterized by a plurality of cell sites, each of said cell sites having a base station which assigns one of a plurality of voice channels to a given wireless call, each of said voice channels having a unique voice channel number, and said phone means includes means for identifying said voice channel number associated with said call.

22. An apparatus for testing transmissions in a wireless communications network, comprising:

phone means for providing wireless access to the network;

measurement means, connected to said phone means, for detecting an incoming test signal transmitted to said phone means from an external source;

processor means for controlling said phone means and said measurement means; and modem means, connected to said processor means and said phone means, for enabling said processor means to communicate with an external control center through said phone means;

wherein said processor means includes means for recording the value of at least one transmission characteristic of the incoming test signal, for comparing said value to a pre-determined pass/fail threshold, and for informing the external control center if said value exceeds said threshold, and said controller means generates said predetermined thresholds based on samplings of the transmission characteristic values.

* * * * *